Jan. 14, 1964 H. F. TAYLOR 3,117,554
BIRD FEEDER
Filed Jan. 17, 1962

INVENTOR.
HOWARD F. TAYLOR
BY *Rines and Rines*
ATTORNEYS

United States Patent Office 3,117,554
Patented Jan. 14, 1964

3,117,554
BIRD FEEDER
Howard F. Taylor, Belmont, Mass., assignor to Edith Taylor, 346 Marsh St., Belmont, Mass.
Filed Jan. 17, 1962, Ser. No. 166,957
2 Claims. (Cl. 119—52)

The present invention relates to bird feeders and, particularly, to bird feeders that may be suspended as, for example, from a branch of a tree.

There are available a large variety of bird feeders which may be installed by being suspended or hung from a tree branch or the like. These bird feeders, however, are generally as accessible to small tree-climbing animals, especially squirrels, as they are to birds, and, thus, most of the feed never reaches the birds for which it is intended.

It is an object of the present invention to provide a new and improved bird feeder in which the bird feed is readily accessible to birds, especially of the smaller species, but which is adapted to render the bird feed inaccessible to small tree-climbing animals.

A further object is to provide such a bird feeder in which the feed supply may be readily and easily replenished.

Other objects will be described hereinafter and will be particularly defined in the appended claims.

The objects of the invention are attained in a bird feeder having, in combination, a base, a hollow feed-container housing supported by the base and provided with an opening near the base for gravity-controlled emission of feed stored within the housing, a lid covering the top of the housing and of cross-dimensions much greater than the cross-dimensions of the housing and the base, the lid being held against the said top of the housing by resilient means as, for example, a spring connected between the inner surface of the lid and the base, and flexible supporting means connected to the upper surface of the lid for hanging the feeder.

Figure 1:
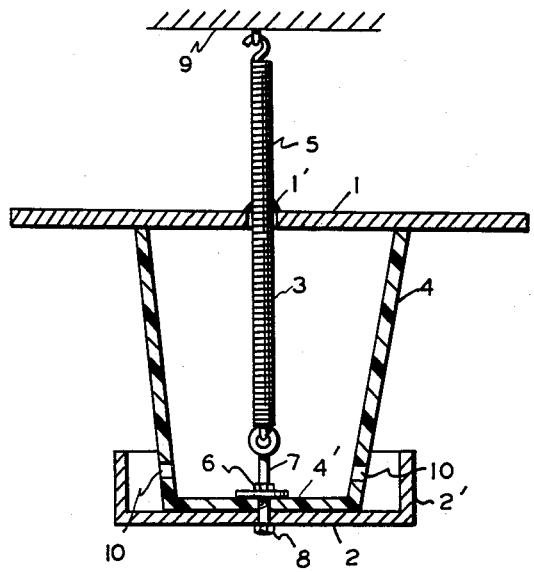
Figure 2:
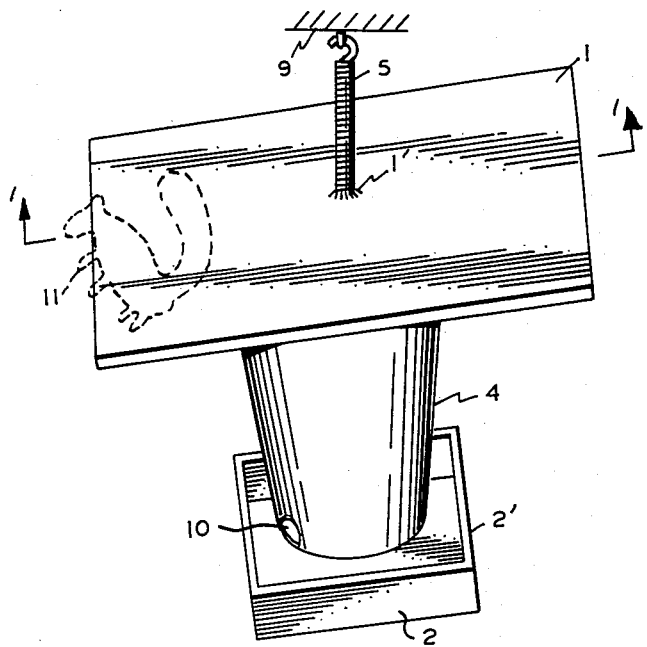

The invention will now be described in connection with the accompanying drawing in which FIG. 1 is a cross-sectional view of an embodiment of the invention taken upon the line 1—1 in FIG. 2; and FIG. 2 is a perspective of a bird feeder of the present invention showing an ineffective attempt by a squirrel to gain access to the feed-emitting end thereof.

The bird feeder hereinafter described acts to prevent small tree-climbing animals, such as squirrels, from removing feed therefrom by presenting a highly unstable tiltable platform of access to the squirrel, shown at 11 in FIG. 2. Extensive tests have shown that the unsuccessful efforts of the squirrels to get at the feed discourages or dissuades their further efforts in a relatively short period of time.

Referring to FIG. 1, the bird feeder comprises a base 2 and a hollow feed-container housing 4, preferably, though not essentially, of inverted frusto-conical configuration, supported by the base 2. A substantially planar lid 1 of cross-dimensions much greater than the cross-dimensions of both the housing 4 and the base 2 covers the top of the housing 4, and is held firmly thereagainst by resilient means, such as a helical spring 3. While the spring 3 must be a relatively high-tension device in order that the assembly of the base 2, the feed-container housing 4 and the lid 1 may be held together as a unitary structure and may move as a unit in response to the weight of a small tree-climbing animal upon the peripheral portions of the relatively wide lid 1, yet the spring 3 must be sufficiently resilient to allow prying the lid open from the top of the housing 4 for replenishment of the feed. The spring 3 is shown secured at 1' at its upper end to a central region of the lid 1, and at its lower end, to an eyebolt 7 that, in turn, passes through an aperture in the bottom wall 4' of the housing and a further aperture in the base 2 and is secured by a washer 6 and a lock nut 8.

The bird feeder is suspended or hung from a support 9, which may be a tree limb, by a flexible supporting means 5, such as a further spring, connected to the substantially central point 1' of the upper surface of the lid 1. The bird feeder is thus rendered highly unstable to any object of substantial weight resting upon the upper surface of the lid 1, and it will tip as a unit as the object moves toward the peripheral portions of the lid. It is desirable, moreover, that the supporting means 5 be also resilient, to effect up-and-down oscillations of the bird feeder when the squirrel jumps upon the lid 1, thus rendering the platform even more unstable. The inverted conical shape of the housing 4 serves further to eliminate any surfaces of possible access to the base region of the feeder.

Feed replenishment is accomplished by prying the lid 1 open, against the resilient action of the spring 3, to expose the top of the feed-container housing 4. The feed, not shown in the drawing, will fall under the control of gravity to the bottom 4' of the feed-container housing 4 and will be emitted from one or more openings 10 therein near the base 2, spilling out upon the base 2 and contained thereon by the peripheral walls 2'. The base 2, in the preferred form of the invention, is not much larger in its cross-dimensions than the bottom of the feed-container housing 4 in order that the bird feeder may be most accessible to the smaller species of birds.

Further modifications, including shape and configuration of the lid, housing and base, will occur to those skilled in the art and all such are considered to fall within the spirit and scope of the present invention as defined in the appended claims.

What is claimed is:

1. A bird feeder comprising, in combination, a base having a bottom wall and an upstanding peripheral side wall defining a receptacle, a hollow cup-shaped feed-container housing having a bottom wall juxtaposed with the bottom wall of the base and having a side wall with an opening near the base for the gravity-controlled emission of feed stored within the housing, a planar lid covering and supported directly upon the top of the side wall of the hollow housing and of cross-dimensions much greater than the cross-dimensions of the housing and the base, a single tension spring connected to the central part of the bottom wall of the housing and extending through the central part of said lid and secured thereto, the tension of said spring holding said lid tightly against said top of the housing and rendering said lid, base, and housing capable of unitary movements, said spring being yieldable to permit said housing to be uncovered for filling, and supporting means on the outer end of said spring for supporting said feeder.

2. The bird feeder of claim 1, said housing being of inverted frusto-conical shape, the bottom wall of said housing having slightly smaller cross-dimensions than the bottom wall of said base, whereby the space between said housing and said base side walls is shielded by said housing.

References Cited in the file of this patent

UNITED STATES PATENTS

| | | |
|---|---|---|
| 510,711 | Rowe | Dec. 12, 1893 |
| 851,320 | Rogers | Apr. 23, 1907 |
| 1,000,667 | Clark | Aug. 15, 1911 |
| 1,274,375 | Blows | Aug. 6, 1918 |
| 1,404,251 | Parker et al. | Jan. 24, 1922 |
| 1,589,771 | Tucker | June 22, 1926 |
| 1,917,371 | Hill | July 11, 1933 |
| 2,344,367 | Pueschel | Mar. 14, 1944 |
| 2,533,538 | Uhrenholdt | Dec. 12, 1950 |
| 2,737,312 | Hamlon | Mar. 6, 1956 |
| 2,969,769 | Paschall | Jan. 31, 1961 |